United States Patent
Pak et al.

(10) Patent No.: US 8,557,212 B2
(45) Date of Patent: Oct. 15, 2013

(54) MESOPOROUS CARBON COMPOSITE CONTAINING CARBON NANOTUBE

(75) Inventors: Chan-ho Pak, Seoul (KR); Hyuk Chang, Seongnam-si (KR); Dae-jong Yoo, Yongin-si (KR); Ji-man Kim, Suwon-si (KR)

(73) Assignee: Samsung SDI Co., Ltd., Suwon (KR)

( * ) Notice: Subject to any disclaimer, the term of this patent is extended or adjusted under 35 U.S.C. 154(b) by 1681 days.

(21) Appl. No.: 11/265,177

(22) Filed: Nov. 3, 2005

(65) Prior Publication Data

US 2006/0116284 A1 Jun. 1, 2006

(30) Foreign Application Priority Data

Nov. 4, 2004 (KR) ........................ 10-2004-0089211

(51) Int. Cl.
- *C01B 31/00* (2006.01)
- *C01B 31/02* (2006.01)
- *D01F 9/12* (2006.01)
- *H01M 4/02* (2006.01)
- *H01M 4/36* (2006.01)
- *H01M 4/62* (2006.01)

(52) U.S. Cl.
USPC ...... 423/414; 429/532; 423/445 R; 423/447.2

(58) Field of Classification Search
USPC .................................................. 502/407, 416
See application file for complete search history.

(56) References Cited

U.S. PATENT DOCUMENTS

| 6,585,948 | B1 | 7/2003 | Ryoo | |
| 6,812,187 | B1 * | 11/2004 | Pak et al. | 502/180 |
| 6,875,374 | B1 * | 4/2005 | Zhan et al. | 252/502 |
| 7,132,385 | B2 * | 11/2006 | Pak | 502/185 |
| 2004/0147620 | A1 * | 7/2004 | Wang et al. | 518/715 |
| 2004/0185342 | A1 * | 9/2004 | Takeuchi et al. | 429/213 |
| 2007/0116625 | A1 * | 5/2007 | Joo et al. | 423/445 R |

FOREIGN PATENT DOCUMENTS

| CN | 1472135 | | 2/2004 | |
| JP | 2002-241124 | | 8/2002 | |
| JP | 2004-071253 | | 3/2004 | |
| KR | 1020010001127 | * | 5/2001 | C01B 39/00 |

OTHER PUBLICATIONS

Ryoo et al (Ordered nanoporous arrays of carbon supporting high dispersions of platinum particles, Nature, vol. 312, (2001), pp. 169-172).*
Munoz, E., et al., "Synthesis of DAM-1 molecular sieves containing single walled carbon nanotubes", Microporous and Mesoporous Materials, Elsevier Science Publishing, New York, U.S., vol. 67, No. 1, Jan. 8, 2004, pp. 61-65.
Alvaro, M., et al. "Photochemistry of single wall carbon nanotubes embedded in a mesoporous silica matrix", Chem. Comm., Nov. 23, 2002, pp. 3004-2005.
Fuertes, A.B., et al. "Control of mesoporous structure of carbons synthesised using a mesostructured silica as template", Microporous and Mesoporous Materials, Elsevier Science Publishing, New York, U.S., vol. 62, No. 3, Aug. 28, 2003, pp. 177-190.
Huang, L., et al. "Controlled growth of single-walled carbon nanotubes from an ordered mesoporus silica template", Nano Letters, ACS, Washington, DC, U.S., vol. 3, No. 3, Feb. 5, 2003, pp. 299-303.
European Search Report.
European Office Action issued Oct. 22, 2009 by the European Patent Office in corresponding European Patent Application No. 05 256 636.1.
"Optical limiting effects of multi-walled carbon nanotubes suspension and silica xerogel composite" by Hongbing, et al, Sep. 14, 2003, Chemical Physics Letters 382 (2003) 313-317.
Korean Office Action of Feb. 22, 2006 in Korean Patent Application No. 10-2004-0089211.
Chinese Office Action dated Nov. 23, 2011 issued for Chinese Patent Application No. 200810174542.5.
Non-Final Office Action dated Dec. 27, 2011 for U.S. Appl. No. 12/944,706.
Final Office Action issued on Jul. 5, 2012 in U.S. Appl. No. 12/944,706.
European Patent Office examination report dated Jul. 12, 2012 in corresponding Application No. 05 256 636.1-2111.
Non-Final Office Action dated May 30, 2013 in U.S. Appl. No. 12/944,706.

* cited by examiner

*Primary Examiner* — Emily Le
*Assistant Examiner* — Michael Forrest
(74) *Attorney, Agent, or Firm* — H.C. Park & Associates, PLC (57) ABSTRACT

Provided are a CNT-mesoporous silica composite, a CNT-mesoporous carbon composite, a supported catalyst using the CNT-mesoporous carbon composite as a support, and a fuel cell using the supported catalyst as the anode, cathode, or both anode and cathode. The CNT-mesoporous carbon composite is prepared using the CNT-mesoporous silica composite. The CNT-mesoporous carbon composite has a high electrical conductivity due to the CNTs contained therein, and thus, when the CNT-mesoporous carbon composite is used in an electrode of a fuel cell, the fuel cell has a remarkably improved performance relative to the conventional catalyst support which does not contain CNTs.

23 Claims, 6 Drawing Sheets

MESOPOROUS CARBON COMPOSITE CONTAINING CARBON NANOTUBE

CROSS-REFERENCE TO RELATED APPLICATIONS

This application claims priority to and the benefit of Korean Patent Application No. 10-2004-0089211, filed on Nov. 4, 2004, which is hereby incorporated by reference for all purposes as if fully set forth herein.

BACKGROUND OF THE INVENTION

1. Field of the Invention

The present invention relates to a carbon nanotube (CNT)-mesoporous carbon composite, a method of preparing the same, a supported catalyst, and a fuel cell, and more particularly, to a CNT-mesoporous carbon composite prepared using a CNT-mesoporous silica composite as a template, a method of preparing the CNT-mesoporous carbon composite, a supported catalyst using the CNT-mesoporous carbon composite as a support, and a fuel cell using the supported catalyst as an anode, cathode, or both anode and cathode.

2. Discussion of the Background

Fuel cells are clean energy sources that have received considerable interest as one of the alternatives for replacing fossil fuels.

A fuel cell is a power generating system that produces direct current electricity through an electrochemical reaction of fuel, such as hydrogen, natural gas, or methanol, with an oxidizing agent. In general, the fuel cell includes an anode (fuel electrode) where a supplied fuel is electrochemically oxidized, a cathode (air electrode) where the oxidizing agent is electrochemically reduced, and an electrolyte membrane which is interposed between the anode and the cathode to provide a path for transporting ions produced at the anode to the cathode. Electrons are generated through the oxidation of the fuel at the anode, work via an external circuit, and are then returned to the cathode to reduce the oxidizing agent. A fuel cell's catalyst is contained in the anode and the cathode and catalyzes the electrochemical reaction. Thus, many trials have been conducted to increase the activity of the catalyst used in the electrodes. The catalytic activity increases as the reaction surface area of the catalyst increases. Reaction surface area increases as the particle diameter of the catalyst decreases, and small particle diameter allows the catalyst particles to be uniformly distributed on the electrode. Where reaction surface area of the catalyst is increased, the surface area of the catalyst support should also be increased.

A catalyst support for the fuel cell should have a large surface area due to high porosity and a high electrical conductivity for the flow of electrons. Amorphous microporous carbon powders known as activated carbon or carbon black are widely used as catalyst support for the fuel cells.

Amorphous microporous carbon powders are generally prepared by chemically and/or physically activating a raw material, such as wood, peat, charcoal, coal, brown coal, coconut peel, and petroleum coke. After activation, the carbon has a pore size of about 1 nm or less and a specific surface area of about 60 $m^2/g$ to about 1000 $m^2/g$. Specifically, Vulcan Black and Ketjen Black, which are commercial products widely used as catalyst support for fuel cells, have a specific surface area of about 230 $m^2/g$ and about 800 $m^2/g$, respectively. Their primary particle diameter is about 100 nm or less.

However, the amorphous microporous carbon particles have poor interconnection of micropores. In particular, in a conventional direct methanol fuel cell (DMFC), a supported catalyst using the amorphous microporous carbon particles as a support has lower reactivity than a catalyst consisting only metal particles. However, using a catalyst consisting of only metal particles increases the cost of the DMFC significantly. Thus, the development of a carbon support capable of improving the reactivity of the catalyst without incurring the cost of a pure metal catalyst is required.

To overcome these problems, a mesoporous carbon molecular sieve is disclosed in Korean Patent Laid-Open Publication No. 2001-0001127. This patent discloses a method of preparing an ordered mesoporous carbon molecular sieve using a mesoporous silica, which is prepared using a surfactant as a template material. In the above method, based on nano-replication, the mesoporous silica, such as "MCM-48" and "SBA-1", has micropores connected three-dimensionally by mesopores and is used as a template to prepare an ordered mesoporous carbon molecular sieve with micropores and mesopores, which have a uniform diameter and are regularly arranged. According to the definition of the International Union of Pure and Applied Chemistry (IUPAC), micropores refer to pores with a diameter of less than 2 nm and mesopores refer to pores with a diameter of 2 to 50 nm.

However, since the mesoporous carbon sieve is composed of amorphous carbon, it has a relatively low electrical conductivity. Therefore, there is a need to improve the electrical conductivity of the support and thus improve the performance of the fuel cell.

SUMMARY OF THE INVENTION

The present invention provides a carbon nanotube (CNT)-mesoporous silica composite and a method of preparing the same.

The present invention also provides a CNT-mesoporous carbon composite for improving the performance of a fuel cell and a method of preparing the same.

The present invention also provides a supported catalyst in which metal catalyst particles are uniformly supported on the CNT-mesoporous carbon composite.

The present invention also provides a fuel cell using the supported catalyst as the cathode, the anode, or both the cathode and the anode.

Additional features of the invention will be set forth in the description which follows, and in part will be apparent from the description, or may be learned by practice of the invention.

The present invention discloses a carbon nanotube (CNT)-mesoporous silica composite comprising CNTs and mesoporous silica.

The present invention also discloses a method of preparing a CNT-mesoporous silica composite, comprising the steps of: dissolving a surfactant in water and adding CNTs to form a mixture, adding a silica source and water to the mixture to form a solution, adding an acid to the solution to adjust the pH, stirring the solution, heating the solution to obtain powders, separating the powders from the solution, washing the powders, and calcining the washed powders.

The present invention also discloses a CNT-mesoporous carbon composite comprising CNTs and mesoporous carbon.

The present invention also discloses a method of preparing a CNT-mesoporous carbon composite, comprising the steps of: preparing a carbon precursor sol by mixing a polymerizable carbon-containing compound with a carrier, impregnating the CNT-mesoporous silica composite with the carbon precursor sol, polymerizing the carbon precursor sol impregnated into the CNT-mesoporous silica composite to obtain a carbon precursor, thermally decomposing the carbon precursor to obtain a carbon structure, and treating the carbon-CNT-silica composite impregnanted with the carbon structure with a solution capable of selectively dissolving silica to remove the silica.

The present invention also discloses a supported catalyst comprising a CNT-mesoporous carbon composite and metal catalyst particles uniformly supported on the CNT-mesoporous carbon composite.

The present invention also discloses a fuel cell comprising a cathode, an anode, and an electrolyte membrane interposed between the cathode and the anode, where either the cathode, the anode, or both the cathode and anode comprises the supported catalyst.

The CNT-mesoporous carbon composite has a high electrical conductivity due to the CNTs contained therein. Thus, when the CNT-mesoporous carbon composite is used as a catalyst support in an electrode of a fuel cell, it provides a remarkably improved performance of the fuel cell relative to the conventional catalyst support, which does not contain CNTs.

It is to be understood that both the foregoing general description and the is following detailed description are exemplary and explanatory and are intended to provide further explanation of the invention as claimed

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art.

In an embodiment of the present invention, first a carbon nanotube (CNT)-mesoporous silica composite is prepared, and then a CNT-mesoporous carbon composite is prepared using the CNT-mesoporous silica composite as template. The CNT-mesoporous carbon composite is in the form of a porous particle substantially composed of carbon. Unlike a conventional amorphous microporous carbon powder having primarily micropores, the CNT-mesoporous carbon composite has both mesopores and micropores in an appropriate ratio.

Pores of the CNT-mesoporous carbon composite may or may not be regularly arranged. In the CNT-mesoporous carbon composite, micropores interconnect via mesopores or mesopores interconnect via micropores. Accordingly, reactants can be easily supplied to micropores via mesopores, and products created in micropores can be easily discharged outside of supported catalyst particles through mesopores.

The CNT-mesoporous carbon composite may be characterized by an average diameter of mesopores or a surface area.

In the CNT-mesoporous carbon composite, the mesopores may have an average diameter of about 2 nm to about 10 nm. If the average diameter of the pores is less than 2 nm, the fuel material supplied cannot be easily diffused, thereby reducing the catalytic activity. If the average diameter of the mesopores is greater than 10 nm, the specific surface area is decreased, thereby reducing the reaction surface area and, thus, the catalytic activity.

The CNT-mesoporous carbon composite may have a specific surface area of about 800 $m^2/g$ or greater, and usually about 1000 $m^2/g$ to about 3500 $m^2/g$. If the specific surface area of the CNT-mesoporous carbon composite is less than about 800 $m^2/g$, the catalyst metal particles may not be uniformly dispersed during preparation of supported catalyst. If the specific surface area of the CNT-mesoporous carbon composite is greater than about 3500 $m^2/g$, too many micropores are present and diffusion of the fuel may be reduced, thereby reducing the catalytic efficiency.

As described above, the CNT-mesoporous carbon composite is prepared by preparing a CNT-mesoporous silica composite, impregnating the CNT-silica composite with a carbon precursor sol, and then dissolving and removing the silica.

A method of preparing a CNT-mesoporous silica composite according to an embodiment of the present invention will now be described.

First, a surfactant is dissolved in water and mixed with CNTs. The concentration of the surfactant can be about 1,000 to about 100,000 parts by weight based on 100 parts by weight of the CNTs. The CNTs may be single-walled CNTs (SWNTs), multi-walled CNTs (MWNTs), or carbon nanofibers CNTs.

Then, a silica source is added to the mixture. The concentration of the silica source can be about 3,000 to about 300,000 parts by weight based on 100 parts by weight of the CNTs. Then, water is added, and the resultant solution may be about 5,000 to about 500,000 parts by weight based on 100 parts by weight of the CNTs. The silica source may be alkoxysilane, which is not specifically limited and may be tetraethoxysilane (TEOS) or tetramethoxysilane, or alternatively the silica source may be an aqueous sodium silicate solution. The concentration of sodium silicate in the aqueous sodium silicate solution may be about 10% to about 30% by weight.

Next, an acid is added to the resultant solution to adjust the pH of the solution. The acid is not specifically limited and may be nitric acid, hydrochloric acid, sulfuric acid, or acetic acid. The pH of the solution may be adjusted from about −0.7 to about 7.0.

Next, the resultant solution is thoroughly mixed by stirring, and then reacted by heating in an oven. The heating temperature of the oven may be about 80° C. to about 160° C. If the heating temperature is less than about 80° C., the resultant solution may not be sufficiently hydrolysed and thus, the product may have a weak structure. If the heating temperature is greater than about 160° C., the desired structure may not be formed. The reaction time is not specifically limited and can be selected according to the reaction conditions such that an appropriate yield can be obtained. Generally, the heating time may be about 30 minutes to about 2 hours. The resultant product is a turbid liquid within which white powders are distributed.

Then, the powders are separated from the turbid liquid using a conventional method, such as filtration and centrifuging. After the separation of the powders, the powders may be washed at least once.

After the washing, the powders are dried and then calcined in a reaction furnace to obtain a CNT-mesoporous silica composite. The drying of the powders may be performed at room temperature for about 12 hours to about 36 hours. The calcination temperature of the dried powders may be about 300° C. to about 550° C. If the calcination temperature is less than about 300° C., a skeletal structure of the template may not be well formed since impurities may remain. If the calcination temperature is greater than about 550° C., the skeletal structure may not be uniform and the CNTs in the composite may be combusted. The calcination may be performed under an oxidizing atmosphere such as air. The calcination may be performed for about 3 hours to about 15 hours. If the calcination time is less than about 3 hours, impurities may remain. If the calcination time is greater than about 15 hours, a lot of time may be spent during the preparation of the CNT-mesoporous silica composite. Therefore, it may be economically desirable to maintain the calcinations time at about 15 hours or less.

The concentration of the CNTs in the CNT-mesoporous silica composite may be about 0.3% to about 10% by weight. If the concentration of the CNTs in the CNT-mesoporous silica composite is less than about 0.3% by weight, an increase of the electrical conductivity over carbon support without CNTs may not result. If the concentration of the CNTs in the CNT-mesoporous silica composite is greater than about 10% by weight, the CNTs may not be uniformly dispersed, and thus the CNT-mesoporous silica composite may not be easily prepared.

The CNT-mesoporous silica composite thus prepared is used as a template to prepare the CNT-mesoporous carbon composite.

A method of preparing a CNT-mesoporous carbon composite according to an embodiment of the present invention will now be roughly described. First, a carbon precursor sol is prepared by mixing a polymerizable carbon-containing compound with a carrier. Next, the carbon precursor sol is impregnated into the CNT-mesoporous silica composite. Then, a carbon precursor is obtained by polymerizing the carbon precursor sol in the CNT-mesoporous silica composite. Next, the carbon precursor and the CNT-mesoporous silica composite undergo thermal decomposition, resulting in a carbon-CNT-silica composite. Finally, the silica is dissolved and removed, and the CNT-mesoporous carbon composite remains.

The carbon precursor is filled in the pores of the CNT-mesoporous silica composite as the template. The term carbon precursor refers to a material that can be carbonized by thermal decomposition. The carbon precursor may be a polymer of a polymerizable carbon-containing compound. The polymerization includes various types of polymerization, such as addition polymerization and condensation polymerization. Examples of the polymerizable carbon-containing compound include carbohydrates and a monomer.

The carbohydrates used in an embodiment of the present invention include monosaccharides, oligosaccharides, and polysaccharides. The carbohydrates may be monosaccharides, oligosaccharides, polysaccharids, or a mixture thereof. Representative examples of the monosaccharides include glucose, fructose, mannose, galactose, ribose, and xylose. These materials may be used alone or in a combination of two or more. The oligosaccharides are carbohydrates composed of two or more monosaccharides joined together by a glycoside bond. Saccharides from disaccharides composed of two monosaccharides to decasaccharides composed of ten monosaccharides are collectively called oligosaccharides. The oligosaccharides include simple ones, which are composed of one type of monosaccharide, and complicated ones, which are composed of two or more types of monosaccharides. Of the oligosaccharides, disaccharides are mainly present in the natural world in an isolated state. Specific examples of the disaccharides include sucrose contained in sugar canes, maltose (malt sugar), which is a digested material of starch by amylase and is a raw material of wheat gluten, and lactose (milk sugar) contained in the milk of mammals.

Reducing groups of the saccharides and hydroxy groups of saccharides or compounds other than the saccharides may undergo dehydration condensation.

Representative examples of monomers that may be used as the polymerizable carbon-containing compound include furfuryl alcohol, divinylbenzene, phenol-formaldehyde, resorcinol-formaldehyde, benzene and anthracene.

The method of filling the carbon precursor in the pores of the template will now be described in detail. First, a carbon precursor sol, which is a mixture of the polymerizable carbon-containing compound with a carrier, is impregnated into the pores of the template. Then, the polymerizable carbon-containing compound in the template is polymerized to form a polymer of the polymerizable carbon-containing compound in the pores of the template.

The carrier maybe in a liquid state and acts as a solvent, dissolving the polymerizable carbon-containing compound, and as a medium carrying the polymerizable carbon-containing compound to the pores of the template. The carrier may be selected from water, an organic solvent, or a mixture thereof. The organic solvent may be alcohol such as ethanol and acetone. However, furfuryl alcohol may be used as the polymerizable carbon-containing compound or as the carrier.

An acid may be further added during the preparation of the carbon precursor sol. The acid may promote the polymerization of the carbon precursor. The acid may be selected from sulphuric acid, hydrochloric acid, nitric acid, sulfonic acid, or derivative or mixture thereof. Representative examples of the sulfonic acid include methylsulfonic acid.

The concentrations of the respective constituents in the mixture are not specifically limited as long as the purpose of the present invention can be accomplished. For example, the concentrations of the respective constituents in the mixture may be as follows.

The concentration of the carrier may be about 300 to about 1000 parts by weight based on 100 parts by weight of the polymerizable carbon-containing compound. If the concentration of the carrier is less than about 300 parts by weight based on 100 parts by weight of the polymerizable carbon-containing compound, impregnation of the mixture into the template may not be performed easily. If the concentration of the carrier is greater than about 1000 parts by weight based on 100 parts by weight of the polymerizable carbon-containing compound, the amount of carbon filled in the template may be reduced detrimentally.

The concentration of the acid may be about 1 to about 30 parts by weight based on 100 parts by weight of the polymerizable carbon-containing compound. If the concentration of the acid is less than about 1 part by weight based on 100 parts by weight of the polymerizable carbon-containing compound, the effect of promoting the polymerization of the polymerizable carbon-containing compound due to the addition of the acid may be minimal. If the concentration of the acid is greater than about 30 parts by weight based on 100 parts by weight of the polymerizable carbon-containing compound, the effect of promoting the polymerization of the polymerizable carbon-containing compound due to the addition of the acid may be diminished.

The polymerization of the polymerizable carbon-containing compound in the pores of the template may be performed by, for example, heat-treatment or UV irradiation. When the polymerization is performed by heat-treatment, the heat-treatment temperature of the CNT-mesoporous silica composite impregnated with the mixture may be about 50° C. to about 250° C. If the heat-treatment temperature is less than about 50° C., the polymerizable carbon-containing compound may not be sufficiently polymerized. If the heat-treatment temperature is greater than about 250° C., the uniformity of the resulting carbon precursor may be decreased. The heat-treatment may also comprise a first heat-treatment and a second heat-treatment. For example, the first heat-treatment may be performed at about 50° C. to about 150° C. and the second heat-treatment may be performed at about 150° C. to about 250° C. Upon completion of the heat-treatment processes, the carbon precursor should be polymerized and the liquid carrier should be vaporized.

The above impregnation and heat-treatment may be repeated. That is, after the polymerization, the dried template may be impregnated with a second prepared carbon precursor sol and then heat-treated as described above.

Thus, after polymerization, the carbon precursor impregnated in the CNT-mesoporous silica composite is is carbonized by the thermal decomposition, resulting in a carbon-CNT-mesoporous silica composite. The thermal decomposition may be performed, for example, by heating the template having the carbon precursor impregnated therein at about 600° C. to about 1400° C. under a non-oxidizing atmosphere. If the temperature is less than about 600° C., a complete carbonization may not occur, and thus the carbon-CNT-silica composite may not be completely formed. If the temperature is greater than about 1400° C., carbon can be thermally decomposed or the structures of the materials used in the CNT-mesoporous silica composite template may be changed. The non-oxidizing atmosphere may be selected from a vacuum, a nitrogen atmosphere, or an inert gas atmosphere, for example. During this process, the carbon precursor is carbonized and the carrier and acid, if used, are removed via evaporation or decomposition.

After thermal decomposition converts the carbon precursor filled in the template to the carbon-CNT-silica composite, the silica is removed by treating the composite with a solution capable of dissolving silica. A solution capable of dissolving silica is defined as a solution that dissolves only the silica from the carbon-CNT-mesoporous silica composite. Examples of a solution capable of dissolving only silica include an aqueous hydrofluoric acid (HF) solution and an aqueous sodium hydroxide solution. It is known that silica is converted to a soluble silicate by alkaline fusion or carbonate melting and reacts with HF to form erodible $SiF_4$. Once the silica is dissolved and removed, the CNT-mesoporous carbon composite remains.

The concentration of the CNTs in the CNT-mesoporous carbon composite may be about 0.6% to about 20% by weight. If the concentration of the CNTs is less than about 0.6% by weight, a positive effect of the CNTs on an increase in electrical conductivity cannot be expected. If the concentration of the CNTs is greater than about 20% by weight, the CNT-mesoporous carbon composite cannot be easily prepared since the CNT-mesoporous silica composite cannot be easily prepared.

A supported catalyst using a CNT-mesoporous carbon composite as a support according to an embodiment of the present invention will now be described.

The supported catalyst comprises a CNT-mesoporous carbon composite with metal catalyst particles uniformly supported on the CNT-mesoporous carbon composite. The CNT-mesoporous carbon composite may have mesopores with an average diameter of about 2 nm to about 10 µm, and it may have a specific surface area of about 800 $m^2/g$ to about 3500 $m^2/g$, The catalytic metal that can be used for the supported catalyst according to an embodiment of the present invention is not specifically limited and specific examples thereof include titanium (Ti), vanadium (V), chromium (Cr), manganese (Mn), iron (Fe), cobalt (Co), nickel (Ni), copper (Cu), zinc (Zn), aluminium (Al), molybdenum (Mo), selenium (Se), tin (Sn), platinum (Pt), ruthenium (Ru), palladium (Pd), tungsten (W), iridium (Ir), osmium (Os), rhodium (Rh), niobium (Nb), tantalum (Ta), lead (Pb), or a mixture thereof.

The catalytic metal may be appropriately selected depending on a specific reaction to which the supported catalyst is to be applied. Also, the catalytic metal may be a single metal or an alloy of two or more metals.

Specifically, when the supported catalyst is used in a catalyst layer of a cathode or an anode of a fuel cell, such as a phosphoric acid fuel cell (PAFC) and a proton exchange membrane fuel cell (PEMFC), Pt may be generally used as the catalytic metal. When the supported catalyst is used in a catalyst layer of an anode of a direct methanol fuel cell (DMFC), a Pt—Ru alloy may be generally used as the catalytic metal, where the atomic ratio of Pt—Ru may be typically about 0.5:1 to about 2:1. Further, when the supported catalyst is used in a catalyst layer of a cathode of DMFC, Pt may be generally used as the catalytic metal.

The catalytic metal particles may have an average particle size of about 1 nm to about 5 nm. If the average particle size of the catalytic metal particles is less than about 1 nm, the catalyst may not catalyse the catalytic reaction. If the average particle size of the catalytic metal particles is greater than about 5 nm, the reaction surface area of the catalytic metal particles is relatively small and the catalytic activity is decreased.

The concentration of the metal catalyst particles in the supported catalyst may be about 40% to about 80% by weight. If the concentration of the metal catalyst particles in the supported catalyst is less than about 40% by weight, the catalyst may be insufficient for use in a fuel cell. If the concentration of the metal catalyst particles in the supported catalyst is greater than about 80% by weight, the cost to produce a fuel cell with high quantities of metal particles is increased.

To prepare the supported catalyst according to an embodiment of the present invention, various known methods to one skilled in the art can be used. For example, the supported catalyst can be prepared by impregnating the support with a solution of the catalytic metal precursor and reducing the catalytic metal precursor. Since such method is well-known, the detailed description thereof will not be provided herein.

A fuel cell according to an embodiment of the present invention will now be described in detail.

The fuel cell comprises a cathode, an anode, and an electrolyte membrane interposed between the cathode and the anode, wherein the cathode, the anode, or both the cathode and the anode comprise the supported catalyst according to the previous embodiment.

Examples of the fuel cell of the present invention include a PAFC, a PEMFC, or a DMFC. The structures of the fuel cells and methods of manufacturing such fuel cells are not specifically limited, and many examples thereof are wellknown to one skilled in the art. Thus, detailed descriptions thereof will not be provided herein.

Hereinafter, the present invention will be described in more detail with reference to the following examples. These examples are given for the purpose of illustration and are not intended to limit the scope of the invention.

EXAMPLE AND COMPARATIVE EXAMPLE

Preparation of a CNT-Mesoporous Silica Composite (A) Example: 5.0 g of a surfactant Triton X-100 (Aldrich) was dissolved in 200 ml of water, and then 0.14 g of single-walled CNTs (SWNTs) was added to the obtained solution and mixed. 48.4 g of tetraethoxysilane (TEOS) was dissolved in the resultant solution, and 300 ml of water and 85 g of a 35% hydrochloric acid solution were added to the resultant mixture. The mixture was stirred at 40° C. for 2 hours.

Figure 1A:
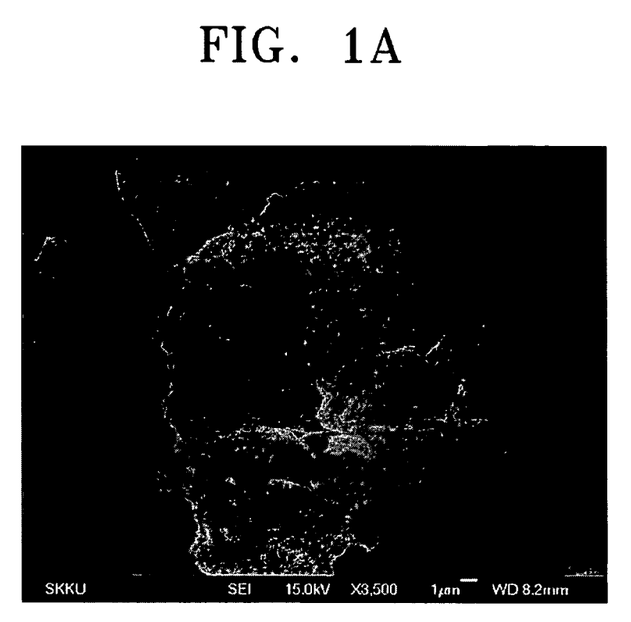
FIG. 1A is a scanning electron microscopic (SEM) photo of a carbon nanotube (CNT)-mesoporous silica composite prepared using a method according to an embodiment of the present invention.
Figure 1B:
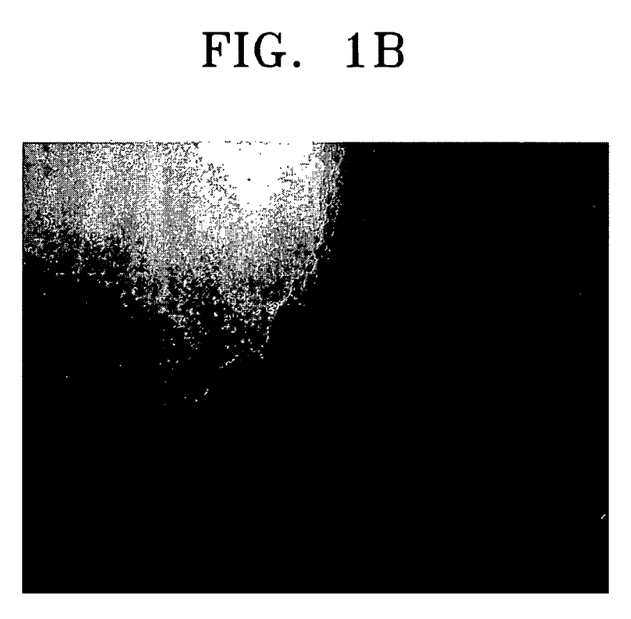
FIG. 1B is a transmission electron microscopic (TEM) photo of a CNT-mesoporous silica composite prepared using a method according to an embodiment of the present invention.

Then, the resultant product was heated in an oven at 100° C. for 2 hours. The powders thus obtained were filtered through a filter paper and washed twice with water. The washed powders were dried at room temperature for 24 hours and calcined in a reaction furnace at 550° C. for 10 hours to obtain a CNT-mesoporous silica composite. FIGS. 1A and 1B are a scanning electron microscopic (SEM) photo and a transmission electron microscopic (TEM) photo, respectively, of the resultant CNT-mesoporous silica composite. FIG. 1B shows a CNT contained in silica.

(B) Comparative Example: A mesoporous silica material was prepared in the same manner as described above, except that SWNTs were not used.

Preparation of a CNT-Mesoporous Carbon Composite (C) Example: 0.94 g of sucrose was dissolved in 3.75 ml of water and then 0.11 g of sulfuric acid was added to the resultant solution and mixed well to obtain a carbon precursor sol. Then, 1 g of the CNT-mesoporous silica composite obtained above was mixed with the carbon precursor sol. The resultant product was heat-treated in an oven at 160° C. for 2 hours. Then, a carbon precursor sol freshly prepared was added to the heat-treated product, wherein the amount of the carbon precursor sol added was 60% of the amount of the carbon precursor sol initially added, and then heat-treated again at 160° C. for 2 hours.

Then, the heat-treated product was thermally decomposed at 900° C. under a nitrogen atmosphere. A ramp rate was 15° C./min. The resultant carbon-CNT-mesoporous silica composite was added to HF and mixed well to remove the silica.

The CNT-mesoporous carbon composite from which the silica was removed was isolated, washed, and dried to obtain the desired CNT-mesoporous carbon composite.

(D) Comparative Example: A mesoporous carbon material was prepared in the same manner as described in (C), except that the mesoporous silica material obtained in (B) was used instead of the CNT-mesoporous carbon composite obtained in (A).

Figure 2A:
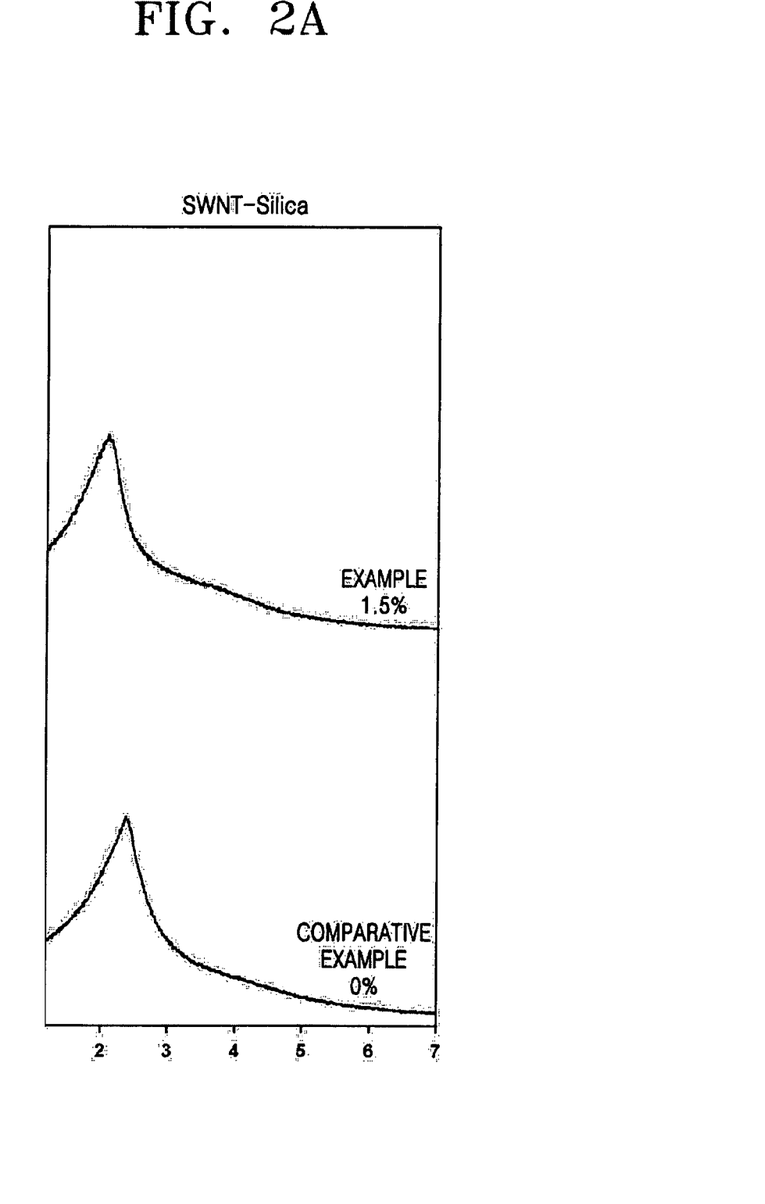
FIG. 2A illustrates X-ray diffraction (XRD) graphs of a CNT-mesoporous silica composite (Example) prepared according to an embodiment of the present invention and a mesoporous silica material prepared without CNTs (Comparative Example)
Figure 2B:
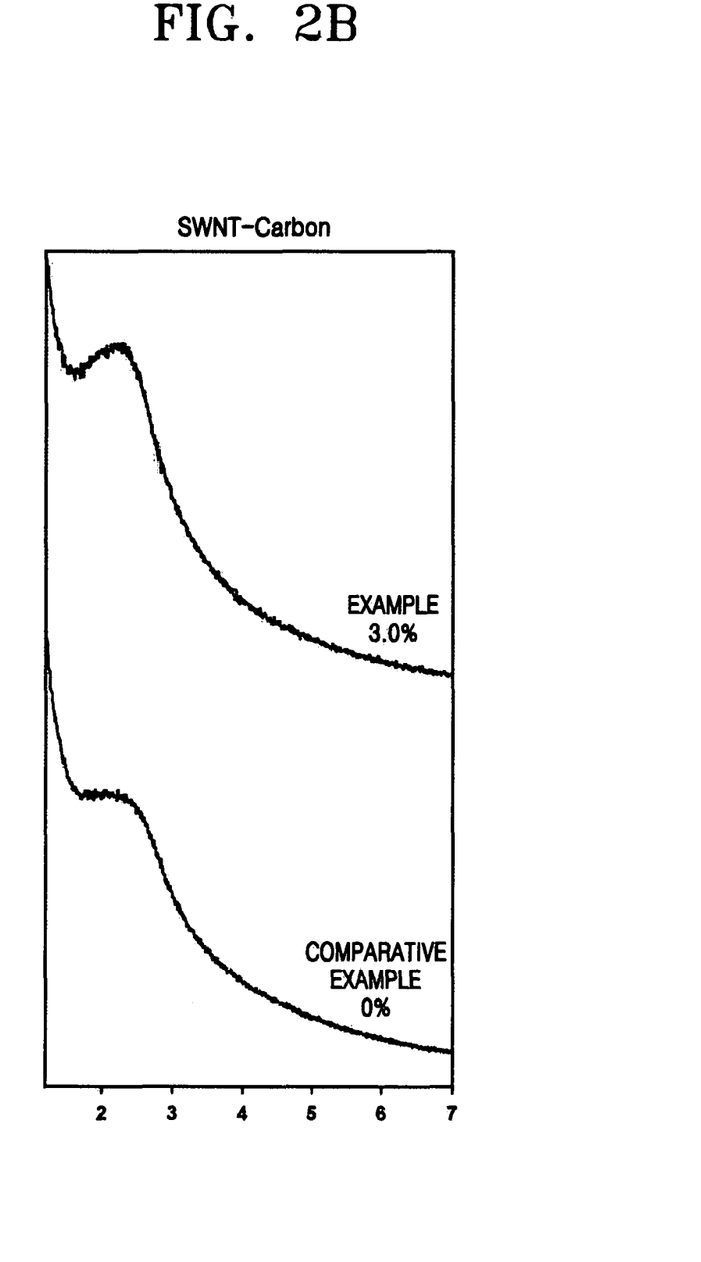
FIG. 2B illustrates XRD graphs of a CNT-mesoporous carbon composite (Example) prepared according to an embodiment of the present invention and a mesoporous carbon material prepared without CNTs (Comparative Example)

FIG. 2A illustrates X-ray diffraction (XRD) patterns of the CNT-mesoporous silica composite prepared in (A) (Example) and the mesoporous silica material not containing CNTs prepared in (B) (Comparative Example). FIG. 2B illustrates XRD patterns of the CNT-mesoporous carbon composite prepared in (C) (Example) and the mesoporous carbon material prepared in (D) (Comparative Example). The shapes and positions of the peaks in the XRD patterns confirmed that pores with uniform structures were arranged.

Figure 3:
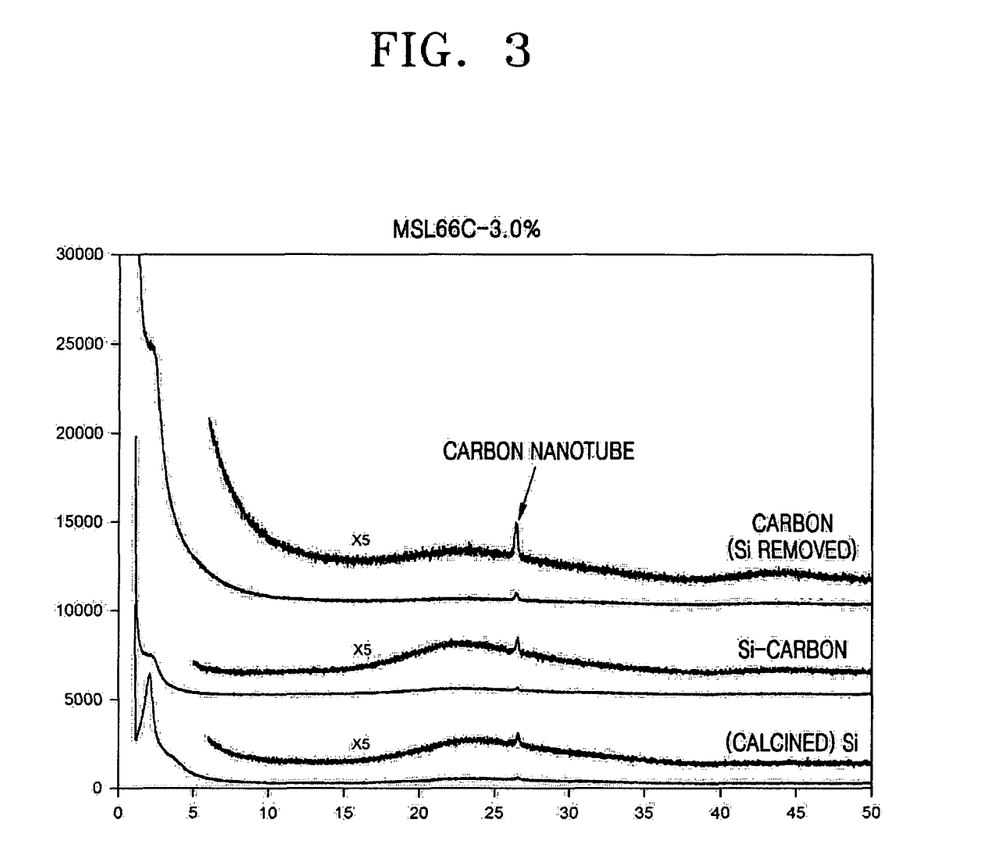
FIG. 3 illustrates XRD graphs of a CNT-mesoporous silica composite, a combination of a CNT-mesoporous silica composite and a carbon-CNT-silica composite before removing the silica, and a CNT-mesoporous carbon composite after removing the silica according to an embodiment of the present invention.

FIG. 3 illustrates XRD patterns of products in the steps of the preparation method of the CNT-mesoporous carbon composite in (C), i.e., the calcined CNT-mesoporous silica composite, a combination of the CNT-mesoporous silica composite and the carbon-CNT-silica composite, and the CNT-mesoporous carbon composite after removing the silica using HF. In all the three cases, a peak corresponding to the CNTs was clearly observed, which indicates that the CNTs were neither modified nor lost throughout the steps of the preparation method.

Nitrogen adsorption tests were performed for the CNT-mesoporous carbon composite prepared in (C) (Example) and the mesoporous carbon material prepared in (D) (Comparative Example). The results are shown in Table 1.

TABLE 1

|  | Example | Comparative Example |
|---|---|---|
| Specific surface area (m$^2$/g) | 2207 | 2970 |
| Pore diameter (nm) | 3.65 | 3.85 |

The data in Table 1 confirms that there was no remarkable difference in a pore diameter between the CNT-mesoporous carbon composite prepared in (C) (Example) and the mesoporous carbon material prepared in (D) (Comparative Example), but the mesoporous carbon material prepared in (D) (Comparative Example) possessed a greater specific surface area than the CNT-mesoporous carbon composite prepared in (C) (Example).

Preparation of a Pt-Supported Catalyst (E) 0.5 g of the CNT-mesoporous carbon composite prepared in (C) (Example) was placed in a plastic bag, and then 0.9616 g of $H_2PtCl_6$ was weighed and dissolved in 1.5 mL of acetone in a beaker. The obtained solution was mixed with the carbon support in the plastic bag. The mixture was dried in air for 4 hours, and then was transferred to a crucible and dried in an oven at a temperature of 60° C. overnight. Then, the crucible was placed in an electric furnace with nitrogen flowing and the nitrogen was allowed to flow for 10 minutes. Next, nitrogen gas was replaced with hydrogen gas and the temperature in the electric furnace was raised from room temperature to 200° C. and maintained for 2 hours to reduce a Pt salt supported on the CNT-mesoporous carbon composite. The hydrogen gas was replaced with nitrogen gas and the temperature in the electric furnace was raised to 250° C. at a rate of 5° C./min, maintained at 250° C. for 5 hours, and then cooled to room temperature. Thus, a catalyst supported on the CNT-mesoporous composite, with a concentration of Pt supported equal to 60% by weight, was obtained.

(F) A catalyst supported on a carbon material, with a concentration of Pt supported equal to 60% by weight, was prepared in the same manner as described in (E), except that the mesoporous carbon material prepared in (D) (Comparative Example) was used instead of the CNT-mesoporous carbon composite prepared in (C) (Example).

Figure 4:
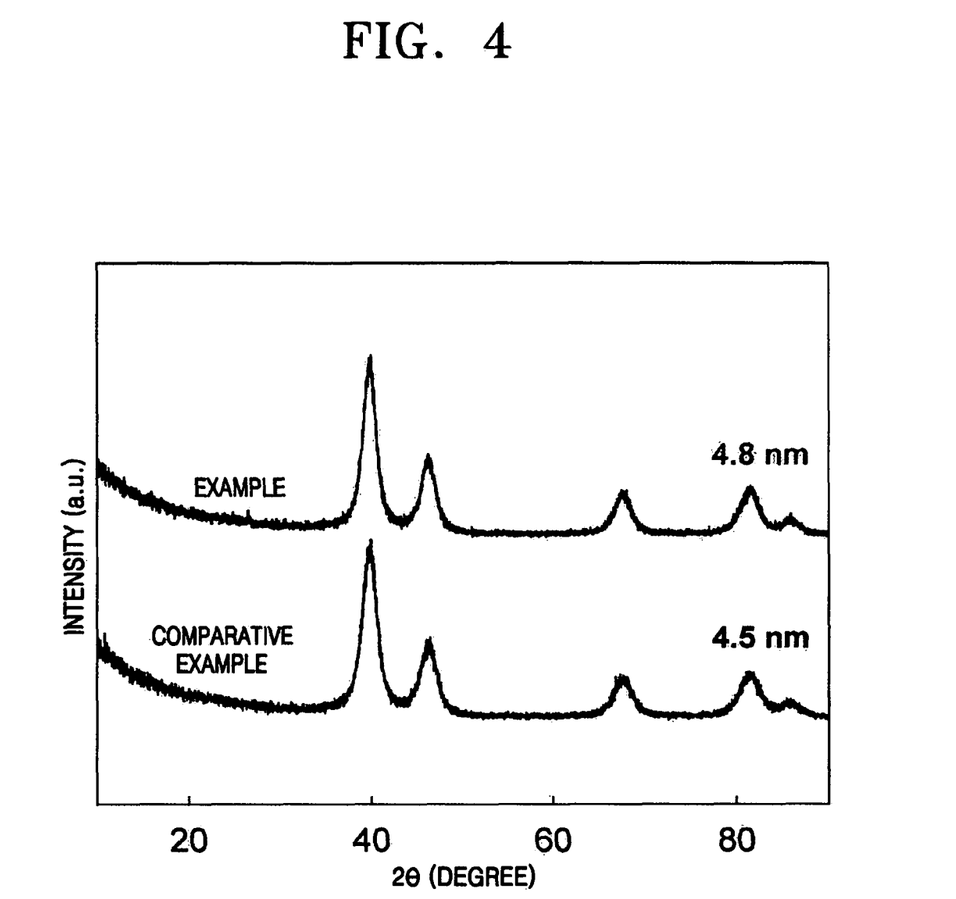
FIG. 4 illustrates XRD graphs of supported catalysts prepared according to an embodiment of the present invention (Example), and supported catalysts prepared without CNTs in the support composite (Comparative Example)

FIG. 4 illustrates XRD patterns of the supported catalysts prepared in (E) (Example) and (F) (Comparative Example). The average particle diameter of the Pt catalyst supported on the CNT-mesoporous carbon composite prepared in (C) (Example) was 4.8 nm, while the average particle diameter of the Pt catalyst supported on the mesoporous carbon material prepared in (D) (Comparative Example) was 4.5 nm.

Preparation of a Fuel Cell (G) The supported catalyst prepared in (E), in which the CNT-mesoporous carbon composite was used as a support, was dispersed in a dispersion solution Dupont-brand Nafion® 115 in isopropyl alcohol to prepare a slurry and was coated on a carbon electrode using a spray process so as to obtain a concentration of 3 mg/cm$^2$ of the coated catalyst, measured by Pt concentration. Then, the electrode was passed through a rolling machine to enhance adhesion between the catalyst layer and carbon electrode, thereby obtaining a cathode. An anode was prepared using a commercially available Pt—Ru Black catalyst and a unit cell was prepared using the cathode and the anode.

(H) A unit cell was prepared in the same manner as described in (G) (Example), except that the supported catalyst prepared in (F) (Comparative Example), in which the mesoporous carbon material was used as a support, was used instead of the supported catalyst prepared in (E) (Example).

Figure 5:
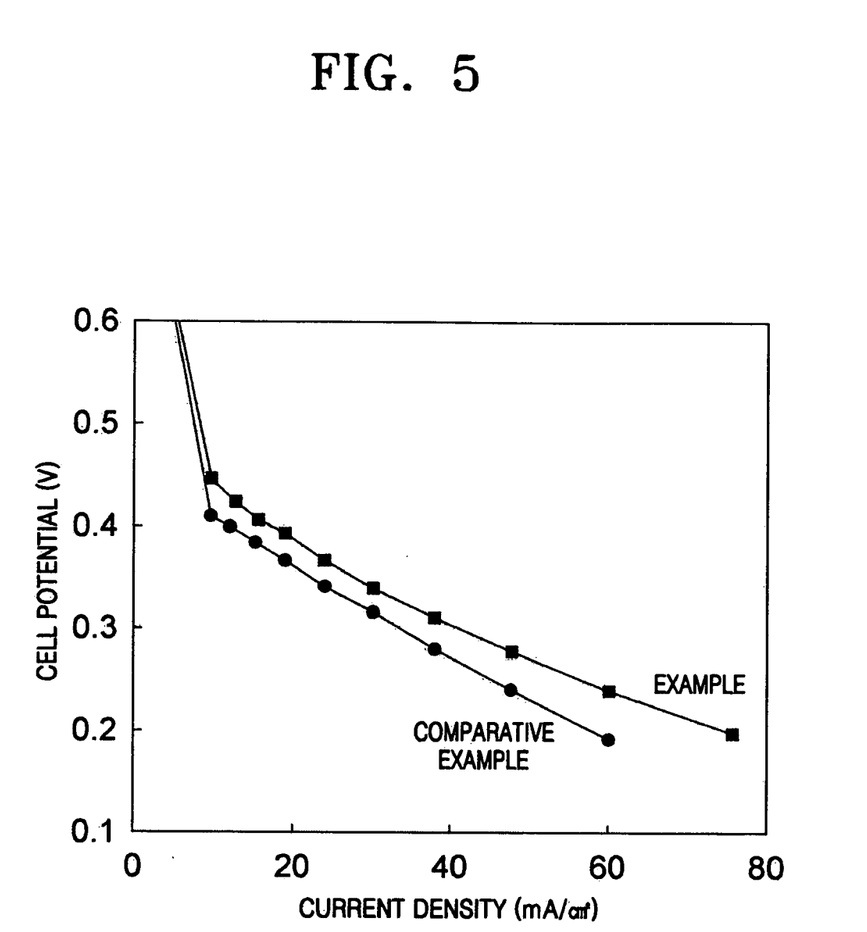
FIG. 5 illustrates graphs of cell potential vs. current density of fuel cells prepared according to an embodiment of the present invention (Example) and fuel cells prepared without CNTs in the catalyst support composite (Comparative Example).

Performances of the unit cells obtained above were measured at 50° C. while excessively supplying 2 M methanol and air. The results are shown in FIG. 5. Although the CNT-mesoporous carbon composite prepared in (C) (Example) has a smaller specific surface area than the mesoporous carbon material prepared in (D) (Comparative Example) as described above, the unit cell prepared using the CNT-mesoporous carbon composite prepared in (C) (Example) has a higher current density at equivalent cell potentials than the unit cell prepared using the mesoporous carbon material prepared in (D) (Comparative Example).

As described above, a CNT-mesoporous carbon composite according to the present invention can be prepared using a CNT-mesoporous silica composite as a template. The CNT-mesoporous carbon composite has a high electrical conductivity due to the CNTs contained therein. Thus, when the CNT-mesoporous carbon composite is used in an electrode of a fuel cell, the fuel cell has a remarkably improved performance relative to the conventional catalyst support that does not contain CNTs.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A carbon nanotube (CNT)-mesoporous carbon composite comprising CNTs and mesoporous carbon,
    wherein mesopores of the CNT-mesoporous carbon composite have an average diameter of about 2 nm to about 10 nm,
    wherein the carbon nanotubes are uniformly dispersed in the mesoporous carbon.

2. The CNT-mesoporous carbon composite of claim 1, wherein the concentration of said CNTs is about 0.6% to about 20% by weight of the CNT-mesoporous carbon composite.

3. The CNT-mesoporous carbon composite of claim 1, wherein the CNT-mesoporous carbon composite has a specific surface area of about 800 m$^2$/g to about 3500 m$^2$/g.

4. A method of preparing a CNT-mesoporous carbon composite, the method comprising:
    preparing a carbon precursor sol by mixing a polymerizable carbon-containing compound with a carrier;
    impregnating a CNT-mesoporous silica composite with the carbon precursor sol;
    polymerizing the carbon precursor sol disposed in the CNT-mesoporous silica composite to obtain a carbon precursor disposed in the CNT-mesoporous silica composite;
    thermally decomposing the carbon precursor to obtain a carbon structure disposed in the CNT-mesoporous silica composite;
    treating the carbon structure disposed in the CNT-mesoporous silica composite with a solution capable of dissolving silica to remove the silica, to thereby form a mesoporous carbon in which the carbon nanotubes are uniformly dispersed.

5. The method of claim 4, wherein the CNT-mesoporous silica composite comprises CNTs and mesoporous silica.

6. The method of claim 4, wherein the CNT-mesoporous silica composite is prepared by:
    dissolving a surfactant in water and adding CNTs to form a mixture;
    adding a silica source and water to the mixture to form a solution;
    adding an acid to the solution to adjust the pH of the solution;
    stirring the solution;
    heating the solution to obtain powders;
    separating the powders from the solution;
    washing the powders at least one time; and
    calcining the powders.

7. The method of claim 4, wherein the polymerizable carbon-containing compound is a carbohydrate or monomer.

8. The method of claim 4, wherein the carrier is water or an organic solvent.

9. The method of claim 4, wherein an acid is added while preparing the carbon precursor sol.

10. The method of claim 4, wherein the polymerizing is performed by heating the carbon precursor sol disposed in the CNT-mesoporous silica composite, at about 50° C. to about 250° C.

11. The method of claim 10, wherein the heat-treatment comprises a first heat-treatment of the carbon precursor sol disposed in the CNT-mesoporous silica composite, at about 50° C. to about 150° C., and a second heat-treatment of the carbon precursor sol disposed in the CNT-mesoporous silica composite, at about 150° C. to about 250° C., in sequence.

12. The method of claim 4, wherein the polymerizing is performed by exposing the carbon precursor sol disposed in the CNT-mesoporous silica composite to UV irradiation.

13. The method of claim 4, wherein the impregnating and the polymerizing is sequentially repeated at least once, prior to the thermal decomposition.

14. The method of claim 4, wherein the thermal decomposition comprises heating the carbon precursor at about 600° C. to about 1400° C.

15. The method of claim 4, wherein the solution capable of dissolving silica is aqueous hydrofluoric acid, aqueous sodium hydroxide, or any solution or combination thereof.

16. A supported catalyst comprising:
   a CNT-mesoporous carbon composite comprising CNTs and mesoporous carbon; and
   metal catalyst particles uniformly supported on the CNT-mesoporous carbon composite,
   wherein mesopores of the CNT-mesoporous carbon composite have an average diameter of about 2 nm to about 10 nm, and
   wherein the carbon nanotubes are uniformly dispersed in the mesoporous carbon.

17. The supported catalyst of claim 16, wherein the CNT-mesoporous carbon composite has a specific surface area of about 800 $m^2$/g to about 3500 $m^2$/g.

18. The supported catalyst of claim 16, wherein the concentration of the metal catalyst particles is about 40% to about 80% by weight of the supported catalyst.

19. The supported catalyst of claim 16, wherein the CNT-mesoporous carbon composite comprises mesoporous silica.

20. A fuel cell comprising:
   a cathode;
   an anode; and
   an electrolyte membrane interposed between the cathode and the anode, wherein either the cathode, the anode, or both the cathode and the anode comprises the supported catalyst disclosed in claim 16.

21. The supported catalyst of claim 16, wherein the CNT-mesoporous carbon composite has a specific surface area of about 2207 $m^2$/g.

22. The supported catalyst of claim 16, wherein the CNT-mesoporous carbon composite has a specific surface area of about 2207 $m^2$/g to about 3500 $m^2$/g.

23. The supported catalyst of claim 16, wherein the CNTs are regularly dispersed in the mesoporous carbon.

* * * * *